United States Patent Office 3,468,555
Patented Sept. 23, 1969

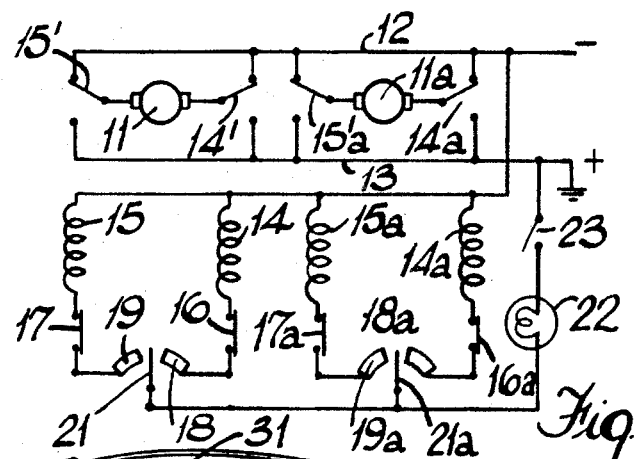
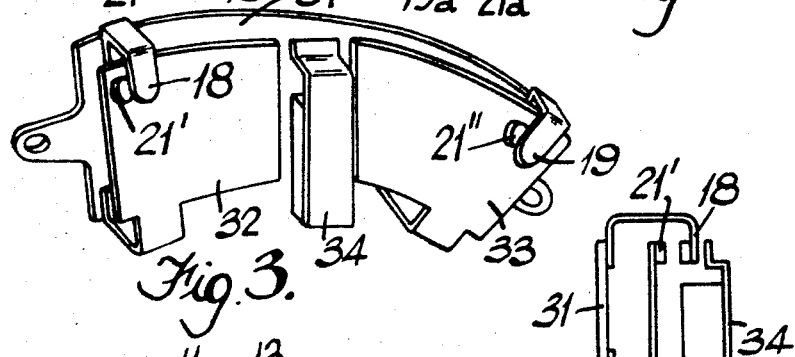
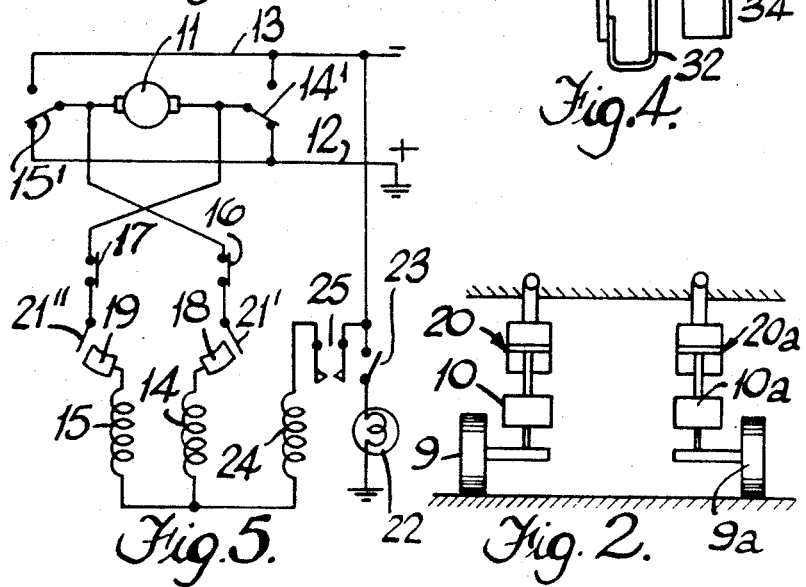

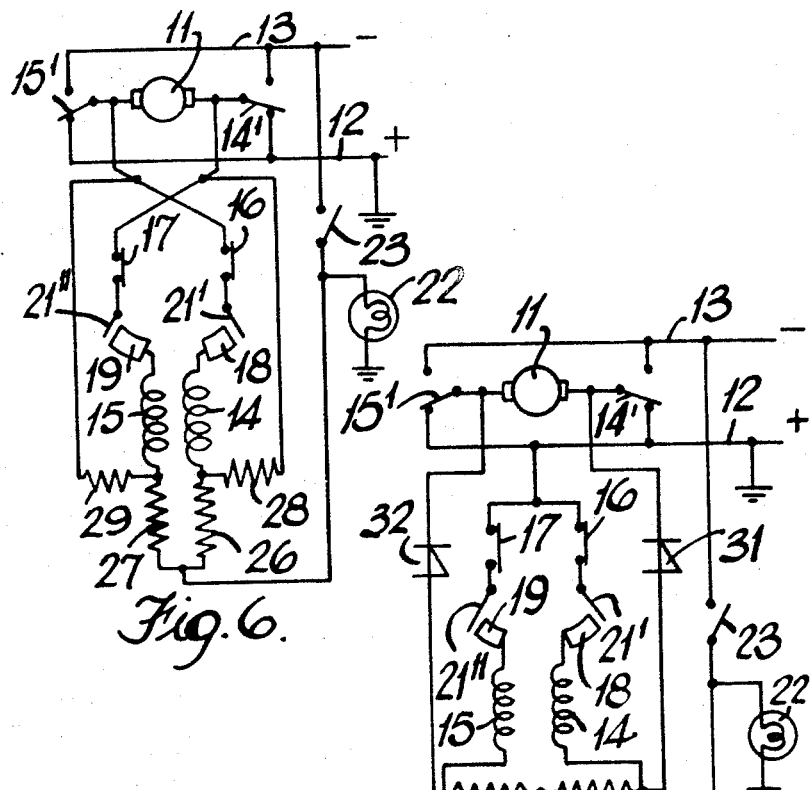
Fig. 6.
Fig. 7.
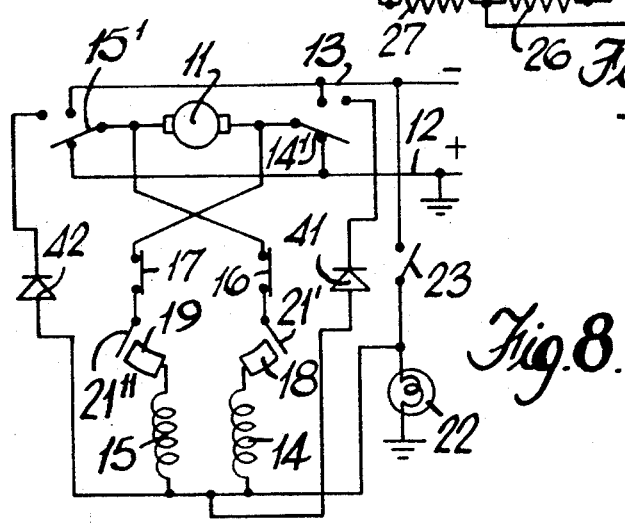
Fig. 8.

3,468,555
REAR SUSPENSION SYSTEMS FOR ROAD VEHICLES
Jeremy Mark Jenkinson, Sutton Coldfield, and Christopher Stephen Rayner, Kings Norton, England, assignors to Joseph Lucas (Industries) Limited, Birmingham, England, a British company
Filed May 10, 1967, Ser. No. 637,485
Claims priority, application Great Britain, May 20, 1966, 22,548/66; Nov. 14, 1966, 50,877/66
Int. Cl. B60g *23/00, 19/02*
U.S. Cl. 280—6　　　　　　　　　　　　　　5 Claims

ABSTRACT OF THE DISCLOSURE

A rear suspension system for a road vehicle includes a pair of devices of adjustable length forming parts respectively of the connecting linkages between the rear wheels and frame of the vehicle, so that the lengths of said devices determine the height of the rear portion of the vehicle relative to the rear wheels when the vehicle is at rest, a pair of reversible motors for adjusting the lengths of said devices, and attitude-sensing switches which are operable to control the motors to determine the lengths of said devices.

Background of the invention

When the rear portion of a road vehicle is loaded, it moves downwardly relative to the rear wheels, with the result that the vehicle headlights are tilted, giving rise to the possibility of dazzling oncoming traffic at night. This risk is considerably greater in the case of vehicles fitted with fluid suspension. The present invention is primarily, but not exclusvely, intended for the use in such vehicles.

Summary of the invention

A rear suspension system for a road vehicle having a frame and rear wheels, including a lengthwise adjustable unit operably connected between each rear wheel and the vehicle frame so that the lengths of the units determine the height of the rear portion of the vehicle relative to the rear wheels when the vehicle is stationary, a reversible electric motor operably related to each adjustable unit for adjusting the lengths of the units, supply lines for said electric motors, relay coils for each electric motor, an attitude-sensing switch for each adjustable unit and operably connected to each motor for controlling the motors to determine the lengths of said adjustable units, each attitude-sensing switch including a pair of fixed contacts and a movable contact, one end of each relay coil being coupled to the fixed contact of each attitude-sensing switch, the movable contact of each attitude-sensing switch being connected to one of the supply lines, the other ends of each of the relay coils being connected to the other supply line, and a manually operable switch in the connection between the removable contact and said one of the supply lines, with said manually operable switch being closed before either electric motor can be energized to adjust the lengths of said adjustable units.

Brief description of the drawings

In the accompanying drawings, which illustrate examples particularly designed for use with a vehicle having fluid suspension, FIGURE 1 is a circuit diagram, FIGURE 2 is a diagrammatic illustrating the physical positioning of the screw jacks, FIGURE 3 is a perspective view of one of the attitude-sensing switches, FIGURE 4 is a side view of the switch shown FIGURE 3, and FIGURES 5 to 8 respectively are circuit diagrams illustrating modifications of FIGURE 1.

Detailed description of the invention

Referring to FIGURES 1 and 2 a pair of reversible electric motors 11, 11$a$ are connected between supply lines 12, 13 energized by the vehicle battery. The motors 11, 11$a$ control a pair of screw jacks 10, 10$a$ which are connected respectively between rear wheels 9, 9$a$ of the vehicle and fluid suspension units 20, 20$a$ associated with the rear wheels, so that the height of the rear portion of the vehicle when the vehicle is at rest is determined by the length of the screw jacks.

Since the operation to control the two rear wheels is identical, the operation of the motor 11 only will be described. The motor 11 is operated in one direction when a relay coil 14 is energized to operate its contact $14^1$, and is operated in the other direction when a relay coil 15 is energized to operate its contact $15^1$. The relay coils 14, 15 are connected through limit switches 16, 17 respectively to fixed contacts 18, 19 of an attitude-sensing switch, with movable contact 21 thereof being connected to the supply line 13 through a warning lamp 22 in series with a switch 23 operated by the driver. The ends of the relay coils 14, 15 opposite the limit switches are connected to the supply line 12.

Assuming that the switch 23 is closed, the arrangement is such that as long as the rear of the vehicle is level with the front of the vehicle, the contact 21 assumes the position shown. However, if the rear of the vehicle should be too high or too low, the contact 21 engages one of the contacts 18, 19, and thus the motor 11 is energized in one direction or the other, to shorten or lengthen the screw jack 10 until the attitude of the vehicle is correct. Both sides of the rear of the vehicle are, of course, adjusted simultaneously, a switch 21$a$ similar to the switch 21, and operated at the same time as the switch 21, serving to control the motor 11$a$. The switch 23 could be manually operable, or could be a switch which, for example, is closed whenever a door of the boot lid of the vehicle is opened, so that an adjustment is made every time the vehicle stops, and one of the doors or the trunk lid is opened. In the latter case, any variation in load will be accounted for, but the system will not operate while the vehicle is actually moving.

One form of attitude-sensing switch is shown in FIGURES 3 and 4. The switch includes a fixed part 31 secured to the frame of the vehicle, and carrying the fixed contacts 18, 19. Secured to the plate 31 are a pair of flexible contact plates 32, 33 carrying contacts $21^1$, $21^{11}$ which together constitute the movable contact 21. A magnet 34 is movable with a part of the vehicle, so that the position of the magnet senses the attitude, of the vehicle. Moreover, as shown in FIGURE 3, when the attitude of the vehicle is correct, the magnet 34 is positioned between the plates 32, 33 and has no effect. When the magnet moves to the left or to the right, as viewed in FIGURE 3, it attracts one or other of the plates 32, 33 and thus closes one or other of the pairs of contacts 18, $21^1$, or 19, $21^{11}$.

Using the type of switch shown in FIGURES 3 and 4, it is possible for both pairs of contacts 18, $21^1$ and 19, $21^{11}$ to be closed simultaneously in certain circumstances. However, this does not matter because the motor remains inoperative, and so no damage will occur. The arrangement could be fluid-damped to minimize the likelihood of such double closure.

In the remaining figures, the motor 11$a$ and its connections are omitted for clarity, it being understood that, as in FIGURE 1, the motor 11$a$ operates at the same time and in the same way as the motor 11.

Referring now to the modification of FIGURE 1 shown in FIGURE 5, it will first be noted that the supply is not completed solely through the switch 23. In this example, the switch 23 completes a circuit to a self-hold relay 24, the contacts 25 of which maintain the circuit which previously had to be maintained by holding the switch 23 closed. The warning lamp 22 is returned to ground, so as to be illuminated whenever the switch 23 or contacts 25 are closed.

In FIGURE 5 the contact 21 is shown in its two parts $21^1$, $21^{11}$ to be in accord with FIGURES 3 and 4, and the power supply is not now completed to the contact 21, but instead is completed through the coils 14, 15 respectively to the fixed contacts 18, 19. The contact $21^1$ is connected through the switch 16 to the junction of the motor 11 and the contact $15^1$, while the contact $21^{11}$ is connected through the switch 17 to the junction of the motor 11 and contact $14^1$.

The operation, which is basically unaffected by the alterations, is as follows. When the switch 23 is closed, then if the vehicle is level, neither of the switches 19, $21^{11}$ or 18, $21^1$ will be closed and so nothing will happen. However, assuming for example, that the switch 18, $21^1$ is closed, a circuit will be completed by way of the switch 23, the coil 24, coil 14, switch 18, $21^1$, switch 16 and contact $15^1$, thereby energizing the coil 14 to move the contact $14^1$ to its alternative position so that the motor 11 is operated. The hold-on circuit is completed as previously explained by the coil 24. As soon as the vehicle is level, the switch 18, $21^1$ opens and the circuit is broken, and the contact $14^1$ then reverts to the position shown. A similar sequence of operation takes place if the switch 19, $21^{11}$ closes. If both switches 18, $21^1$ and 19 $21^{11}$ are closed simultaneously, both contacts $14^1$, $15^1$ will be moved to their alternative positions, so that the circuit is broken.

FIGURE 6 operates in the same way as FIGURE 5, but incorporates an alternative form of self-hold circuit. Instead of the coil 24 and contacts 25, resistors 26, 27 are included in series with the coils 14, 15 respectively, with the junction of coil 14 and resistor 26 being connected through a resistor 28 to the junction of the motor 11 and the contact $14^1$, and the junction of the resistor 27 and coil 15 is connected through a resistor 29 to the junction of the motor 11 and the contact $15^1$. Assuming for example, that when the switch 23 is closed, the coil 14 is energized, then the resultant movement of the contact $14^1$ to its alternative position completes a hold-on circuit through the resistor 28 to the coil 14. The resistors 28, 29 could be replaced by diodes.

In FIGURE 7, the resistors 28, 29, in FIGURE 6 are replaced by diodes 31, 32, and the switches 16, 17 are both connected directly to the positive supply line. The operation is unaffected, but in order to cater for the possibility of both switches 18, $21^1$ and 19, $21^{11}$ being energized simultaneously, the values of the resistors 26, 27 are so chosen that if this situation arises, the division of current between the coils 14, 15 is such that one of the coils has its current path through resistors 26 and 27 in series, thus reducing the current flowing through the coil to a value such that it is not energized to close its contact.

Instead of using two resistors 26, 27 a single resistor can be used in the line between the switches 16, 17 and the positive supply line. The division of current between the coils 14, 15 reduces the current flowing through each coil to a value such that it is not energized to close its contact.

FIGURE 8 illustrates an example which is similar to FIGURE 5, except that an alternative form of hold-on circuit is used. As will be seen, the contacts $14^1$, $15^1$ complete their own hold-on circuits by way of diodes 41, 42 respectively, and the arrangement is such that the contacts $14^1$, $15^1$ complete the motor circuit before the hold-on circuit.

In all the circuits shown, a different form of attitude switch could be used which is designed so that the double closure condition referred to cannot occur. For example, the switch could be a simple mechanical switch with two fixed contacts and a movable contact engageable alternatively with the fixed contacts in response to vertical movements at the frame of the vehicle. The use of such a switch would enable FIGURES 5 to 8 to be simplified, but in many cases it is preferable to use a switch such as the switch shown in FIGURES 3 and 4 and to design the circuit so that any double closure which does occur will not matter.

In all the circuits described, safety device can be incorporated for preventing the motor from remaining energized for a protracted period in the event of a fault. Such a circumstance could arise, for example, if the gears slip and the motor does not drive the screw jack, or if the voltage available is sufficient to operate one of the relays but insufficient to allow the motor to drive the screw jack. A convenient safety device would be a time delay switch, which could be used in place of the switch 23, with the delay period being set so that the delay switch opens to de-energize the motor after a period of time slightly longer than the normal operating time of the circuit.

Having thus described our invention what we claim as new and desire to secure by Letters Patent is:

1. A rear suspension system for a road vehicle having a frame and rear wheels, including a lengthwise adjustable unit operably connected between each rear wheel and the vehicle frame so that the lengths of the units determine the height of the rear portion of the vehicle relative to the rear wheels when the vehicle is stationary, a reversible electric motor operably related to each adjustable unit for adjusting the lengths of the units, supply lines for said electric motors, relay coils for each electric motor, an attitude-sensing switch for each adjustable unit and operably connected to each motor for controlling the motors to determine the lengths of said adjustable units, each attitude-sensing switch including a pair of fixed contacts and a movable contact, one end of each relay coil being coupled to the fixed contact of each attitude-sensing switch, the movable contact of each attitude-sensing switch being connected to one of the supply lines, the other ends of each of the relay coils being connected to the other suply line, and a manually operable switch in the connection between the movable contact and said one of the supply lines, with said manually operable switch being closed before either electric motor can be energized to adjust the lengths of said adjustable units.

2. The system as claimed in claim 1 including a further switch operable automatically whenever a door of the vehicle is opened, with each motor being prevented from operating until said further switch is operated.

3. The system as claimed in claim 1 including a self-hold circuit operable to ensure that a levelling operation is completed once started.

4. The system as claimed in claim 1 including a device for limiting the period for which said motors can be energized.

5. The system as claimed in claim 4 in which said device is a time delay switch.

References Cited

UNITED STATES PATENTS

| 3,264,008 | 8/1966 | Allinquant | 280—124 |
| 3,120,962 | 2/1964 | Long. | |
| 2,268,017 | 12/1941 | Busick | 280—6.1 |
| 1,990,798 | 2/1935 | Richter | 280—6 |

PHILIP GOODMAN, Primary Examiner

U.S. Cl. X.R.

280—124